United States Patent
Boyfield et al.

(10) Patent No.: US 7,035,945 B2
(45) Date of Patent: Apr. 25, 2006

(54) METHOD AND APPARATUS FOR IDENTIFYING COMPUTER EXPANSION CARDS

(75) Inventors: Julian Boyfield, Hexham (GB); Graham D. Parrington, Pity Me (GB); Jonathan H. Kaplan, Cambridge, MA (US)

(73) Assignee: SUN Microsystems Inc., Santa Clara, CA (US)

( * ) Notice: Subject to any disclaimer, the term of this patent is extended or adjusted under 35 U.S.C. 154(b) by 0 days.

(21) Appl. No.: 10/402,453

(22) Filed: Mar. 27, 2003

(65) Prior Publication Data

US 2004/0193753 A1    Sep. 30, 2004

(51) Int. Cl.
*G06F 13/00* (2006.01)
*H03K 19/0185* (2006.01)

(52) U.S. Cl. .................... 710/10; 8/11; 8/16; 8/102; 8/103; 8/104; 8/301; 8/302; 713/1; 713/2; 713/100

(58) Field of Classification Search ............... 710/8, 710/10, 11, 16, 102, 103, 301, 302, 104; 713/1, 2, 100
See application file for complete search history.

(56) References Cited

U.S. PATENT DOCUMENTS

| | | | |
|---|---|---|---|
| 5,802,365 A | 9/1998 | Kathail et al. ............... 719/321 |
| 6,041,364 A | 3/2000 | Lortz et al. ................. 709/301 |
| 6,055,595 A * | 4/2000 | Tachibana et al. .......... 710/301 |
| 6,263,378 B1 | 7/2001 | Rudoff et al. ............... 709/327 |
| 6,484,226 B1 * | 11/2002 | Wallach et al. ............. 710/302 |
| 6,662,240 B1 * | 12/2003 | Siefert .......................... 710/8 |
| 6,671,749 B1 * | 12/2003 | Williams et al. ............. 710/10 |
| 2002/0120857 A1 | 8/2002 | Krishnan et al. ............ 713/193 |
| 2003/0171138 A1 * | 9/2003 | Huckins et al. .............. 455/558 |
| 2004/0015632 A1 * | 1/2004 | Nguyen et al. .............. 710/305 |

* cited by examiner

*Primary Examiner*—Tammara Peyton
(74) *Attorney, Agent, or Firm*—Park, Vaughan & Fleming LLP; Edward J. Grundler

(57) ABSTRACT

One embodiment of the present invention provides a system that facilitates identifying expansion cards installed in a computer system. The system operates by first examining a device tree for the computer system to identify nodes within the device tree that are associated with the computer expansion cards. Next, the system obtains a subset of parameters from the device tree that are associated with the computer expansion cards, and then performs a pattern match between the subset of parameters for each card and entries in an information file to identify each computer expansion card.

12 Claims, 2 Drawing Sheets

METHOD AND APPARATUS FOR IDENTIFYING COMPUTER EXPANSION CARDS

BACKGROUND

1. Field of the Invention

The present invention relates to expansion cards within computer systems. More specifically, the present invention relates to a method and an apparatus for identifying which expansion cards are installed in a computer system.

2. Related Art

Modern computer systems are typically configured to accommodate expansions cards that provide additional functionality and resources. For example, expansion cards can provide various bus or network interfaces. Expansion cards can also improve computational performance by, for example, providing a graphics accelerator, and can increase storage capacity by providing interfaces to additional disk drives.

As larger numbers of expansion cards are incorporated into a computer system, it becomes progressively harder for a system administrator to determine which expansion cards are installed in the computer system. It is often necessary for a system administrator to know which expansion cards are incorporated into a computer system, for example, to plan upgrades, to determine servicing requirements, and to determine if a given application will execute on the computer system.

Some expansion cards, such as expansion cards adhering to the Small Computers System Interface (SCSI) standard, provide an inquiry command, which allows an expansion card to be queried to identify the expansion card. This makes it easy to identify what types of expansion cards are incorporated in a computer system.

However, other expansions cards, for example expansion cards adhering to the Peripheral Component Interconnect (PCI) standard, do not support queries of this type. For expansion cards of this type, the process of determining which expansion cards are installed in a computer system typically involves manual techniques, which are time-consuming and error-prone. For example, when an expansion card is installed in a computer system, the system administrator can manually update a configuration file to identify the expansion card. This configuration file can subsequently be accessed to determine which expansion cards are installed in the computer.

Hence, what is needed is a method and an apparatus for identifying computer expansion cards that without the problems described above.

SUMMARY

One embodiment of the present invention provides a system that facilitates identifying expansion cards installed in a computer system. The system operates by first examining a device tree for the computer system to identify nodes within the device tree that are associated with the computer expansion cards. Next, the system obtains a subset of parameters from the device tree that are associated with the computer expansion cards, and then performs a pattern match between the subset of parameters for each card and entries in an information file to identify each computer expansion card.

In a variation of this embodiment, the system subsequently reports a description of the computer expansion cards to a user.

In a variation of this embodiment, the subset of parameters includes a device class, a vendor identifier, and a device identifier for the computer expansion card.

In a further variation, each node includes zero or more subnodes associated with the computer expansion card.

In a further variation, performing the pattern match between the subset of parameters and the entry in the information file involves matching each node and any subnodes associated with the computer expansion card.

In a further variation, the information file includes parameters for computer expansion cards that are likely to be installed in the computer system.

In a further variation, the information file is updated when a new computer expansion card becomes available.

In a further variation, the information file is stored in a memory device within the computer system.

Table 1 presents the contents of an information file in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
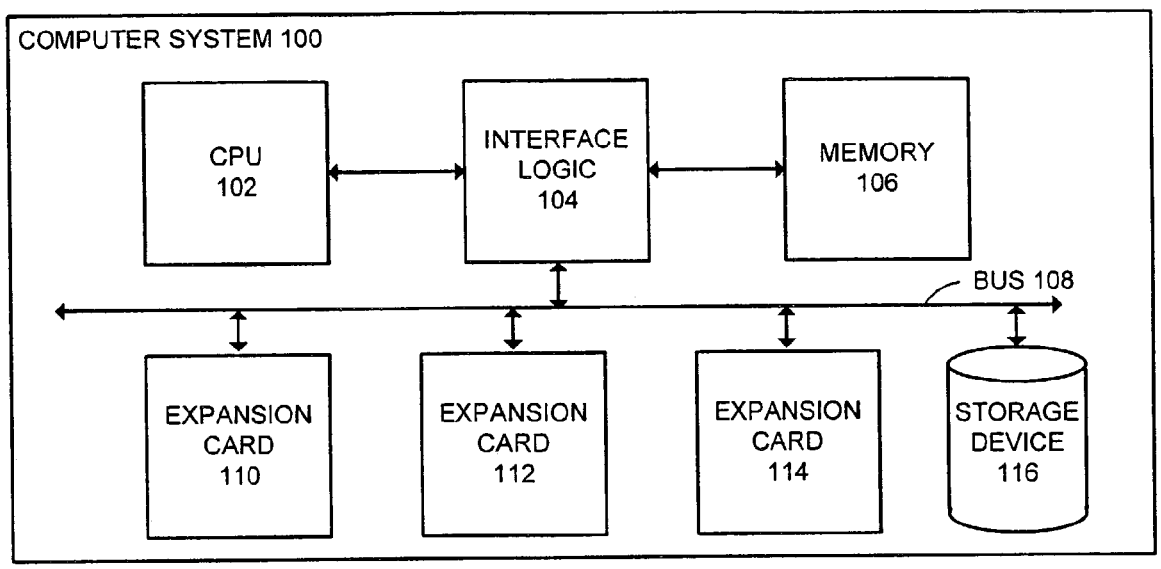
FIG. 1 illustrates a computer system in accordance with an embodiment of the present invention.

FIG. 1 illustrates computer system 100 in accordance with an embodiment of the present invention. Computer system 100 includes CPU 102, interface logic 104, memory 106, expansion cards 110, 112, and 114, and file system 116. Interface logic 104 couples together CPU 102, memory 106, and bus 108. Bus 108 couples expansion cards 110, 112, and 114, and storage device 116 to interface logic 104. Bus 108 can include any kind of computer bus for coupling together the various components of computer system 100. In one embodiment of the present invention, bus 108 includes the peripheral component interconnect (PCI) bus.

CPU 102 executes computer instructions and causes the various components of the computer system to work together. These computer instructions can command components within expansion cards 110, 112 and 114 to perform various operations.

Expansion cards 110, 112, and 114 include various components for computer system 100. For example, these components can include network or bus interfaces, graphics accelerators, and storage device controllers. Note that there can be more or fewer expansion cards than shown in FIG. 1.

Storage device 116 provides persistent storage for computer system 100 and can include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, storage device 116 contains an information file used to identify expansion cards installed in computer system 100.

Process of Matching Parameters

Figure 2:
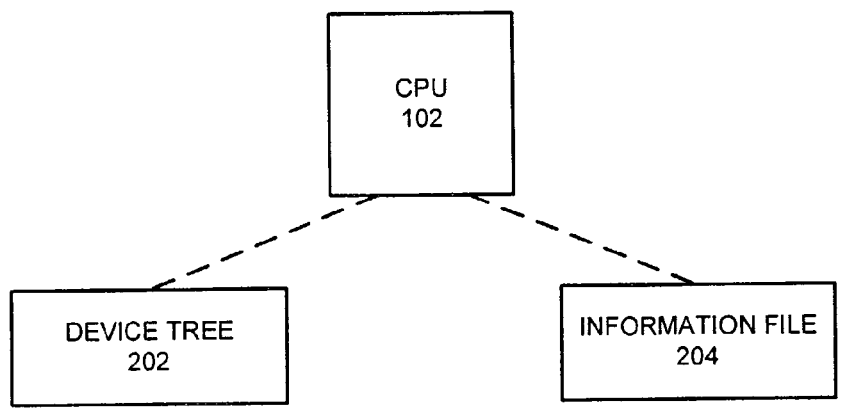
FIG. 2 illustrates the process of matching a subset of parameters with an information file in accordance with an embodiment of the present invention.

FIG. 2 illustrates the process of matching a subset of parameters with an information file in accordance with an embodiment of the present invention. During operation, CPU 102 queries device tree 202 to obtain a subset of parameters related to a given expansion card, for example expansion card 112. CPU 102 then performs a pattern match using this subset of parameters and data stored within an information file 204.

Information file 204 contains entries for each type of computer expansion card that is likely to be installed in computer system 100. When new expansion cards become available, information file 204 is updated to include the new card type.

Table 1 presents an exemplary information file in accordance with an embodiment of the present invention. More specifically, Table 1 includes information for two different types of expansion cards—a high-speed serial interface and a dual ultra-3 SCSI interface. Note that the use of the octothorp (#) in the first column of a line indicates that the line contains a comment intended for a human reader, while lines that do not start with the octothorp are used in performing the pattern matching described above.

For example, within Table 1, the profile for the high-speed serial interface presents a single node of class "obp-device" for this expansion card, while the profile for the dual Ultra-3 SCSI expansion card presents a node of class "pci" and two subnodes of class "scsi". During the pattern matching process, if the subset of parameters from the device tree indicates a class of "obp-device," a vendor-id of 0x114f, and a device-id of 0x1c, the system reports a "High Speed Serial Interface", manufactured by "Performance Technologies," with a part number of "370-2728-XX" to the user.

TABLE 1

```
# File: PCIinfo

# This file is used to profile Expansion Cards.
# The _profile entry for each card defines a list of device tree properties
# that are necessary and sufficient to identify a card in the device tree.

# HSI
{
    Description="High Speed Serial Interface"
    ModelName="HSI"
```

TABLE 1-continued

```
    PartNumber="370-2728-XX"
    Manufacturer="Performance Technologies"
    _profile={
            { _class="obp-device" vendor-id=0x114f device-id=0x1c }
    }
}
# Dual Ultra-3 SCSI (Jasper)
{
    Description="Dual Ultra-3 SCSI HBA (LVD 160)"
    ModelName="Jasper"
    PartNumber="375-3057-XX"
    Manufacturer="Qlogic"
    _profile={
            { _class="pci" vendor-id=0x8086 device-id=0xb154
                { class="scsi" vendor-id=0x1077 device-id=0x1016 }
                { class="scsi" vendor-id=0x1077 device-id=0x1016 }
            }
    }
}
```

Note that some device entries specify more than one node in the device tree and some entries include multiple subnodes for the one or more nodes in the device tree. For example, in order to match the Dual Ultra-3 SCSI card (the "Jasper" card), an expansion card has to match the node an both subnodes of the profile.

Identifying Computer Expansion Cards

Figure 3:
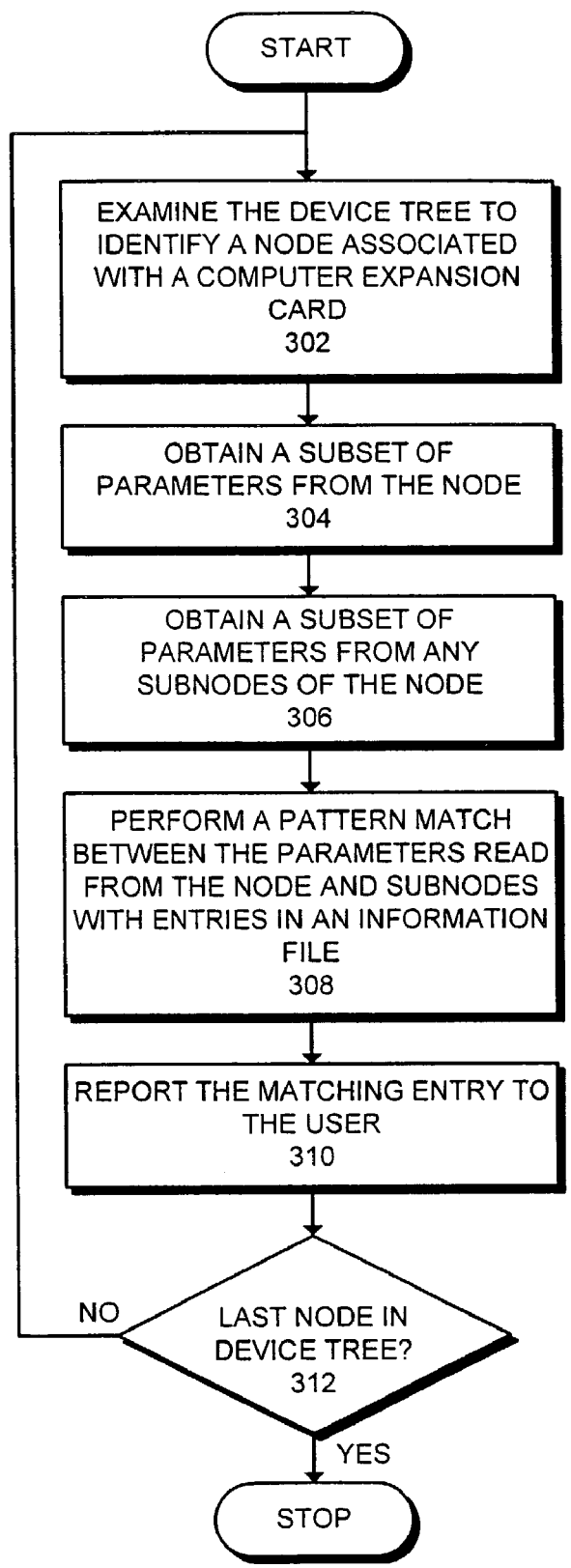
FIG. 3 presents a flowchart illustrating the process of identifying computer expansion cards in accordance with an embodiment of the present invention.

FIG. 3 presents a flowchart illustrating the process of identifying computer expansion cards in accordance with an embodiment of the present invention. The system starts by examining a device tree to identify a node associated with a computer expansion card (step 302). After identifying a node associated with a computer expansion card, the system obtains a subset of parameters from the node (step 304). Additionally, the system obtains a subset of parameters from any subnodes related to the node (step 306).

Next, the system performs a pattern match between the parameters read from the node and any subnodes if the device tree with entries in an information file (step 308). The system then reports the matching entry to the user (step 310). Finally, the system determines if the last node in the device tree has been examined (step 312). If so, the process is terminated. Otherwise, the process returns to step 302 to examine the next node in the device tree.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying a computer expansion card which does not support an inquiry command which allows a computer system to identify the expansion card, comprising:

examining a device tree for the computer system to identify a node and zero or more subnodes within the device tree that is associated with the computer expansion card;

obtaining a subset of parameters from the device tree associated with the node and the zero or more subnodes associated with the computer expansion card, wherein the subset of parameters include a device class, a vendor identifier, and a device identifier;

performing a pattern match between the subset of parameters for the node and the zero or more subnodes and an entry in an information file to identify the computer expansion card, wherein the pattern match has to match both the node and the zero or more subnodes;

reporting a textual description of the computer expansion card from the entry in the information file to a system administrator to enable the system administrator to perform administrative operations on the computer expansion card; and repeating the steps of examining, obtaining, pattern matching, and reporting, wherein repeating these steps provides the system administrator with a complete configuration for the computer system.

2. The method of claim 1, wherein the information file includes parameters for computer expansion cards that are likely to be installed in the computer system.

3. The method of claim 2, wherein the information file is updated when a new computer expansion card becomes available.

4. The method of claim 3, wherein the information file is stored in a memory device within the computer system.

5. A computer-readable storage medium storing instructions that when executed by a computer cause the computer to perform a method for identifying a computer expansion card which does not support an inquiry command which allows a computer system to identify the expansion card, the method comprising:

examining a device tree for the computer system to identify a node and zero or more subnodes within the device tree that is associated with the computer expansion card;

obtaining a subset of parameters from the device tree associated with the node and the zero or more subnodes associated with the computer expansion card, wherein the subset of parameters include a device class, a vendor identifier, and a device identifier;

performing a pattern match between the subset of parameters for the node and the zero or more subnodes and an entry in an information file to identify the computer expansion card, wherein the pattern match has to match both the node and the zero or more subnodes;

reporting a textual description of the computer expansion card from the entry in the information file to a system administrator to enable the system administrator to perform administrative operations on the computer expansion card; and repeating the steps of examining, obtaining, pattern matching, and reporting, wherein repeating these steps provides the system administrator with a complete configuration for the computer system.

6. The computer-readable storage medium of claim 5, wherein the information file includes parameters for computer expansion cards that are likely to be installed in the computer system.

7. The computer-readable storage medium of claim 6, wherein the information file is updated when a new computer expansion card becomes available.

8. The computer-readable storage medium of claim 7, wherein the information file is stored in a memory device within the computer system.

9. An apparatus for identifying a computer expansion card which does not support an inquiry command which allows a computer system to identify the expansion card, comprising:

an examining mechanism configured to examine a device tree for the computer system to identify a node and zero or more subnodes within the device tree that is associated with the computer expansion card;

a parameter obtaining mechanism configured to obtain a subset of parameters from the device tree associated with the node and the zero or more subnodes associated with the computer expansion card, wherein the subset of parameters include a device class, a vendor identifier, and a device identifier;

a pattern matching mechanism configured to perform a pattern match between the subset of parameters for the node and the zero or more subnodes and an entry in an information file to identify the computer expansion card from the entry in the information file, wherein the pattern match has to match both the node and the zero or more subnodes;

a reporting mechanism configured to report a textual description of the computer expansion card to a system administrator to enable the system administrator to perform administrative operations on the computer expansion card; and a repeating mechanism configured to repeat the steps of examining, obtaining, pattern matching, and reporting, wherein repeating these steps provides the system administrator with a complete configuration for the computer system.

10. The apparatus of claim 9, wherein the information file includes parameters for computer expansion cards that are likely to be installed in the computer system.

11. The apparatus of claim 10, wherein the information file is updated when a new computer expansion card becomes available.

12. The apparatus of claim 11, wherein the information file is stored in a memory device within the computer system.

* * * * *